(12) United States Patent
Walters

(10) Patent No.: US 10,093,171 B2
(45) Date of Patent: Oct. 9, 2018

(54) VEHICLE GRILL WITH RECIPROCAL MOVEABLE LOUVERS

(71) Applicant: Lacks Enterprises, Inc., Grand Rapids, MI (US)

(72) Inventor: David Walters, Caledonia, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 91 days.

(21) Appl. No.: 14/874,674

(22) Filed: Oct. 5, 2015

(65) Prior Publication Data

US 2016/0096425 A1 Apr. 7, 2016

Related U.S. Application Data

(60) Provisional application No. 62/059,302, filed on Oct. 3, 2014.

(51) Int. Cl.
*B60K 11/08* (2006.01)

(52) U.S. Cl.
CPC ............. *B60K 11/085* (2013.01); *Y02T 10/88* (2013.01)

(58) Field of Classification Search
None
See application file for complete search history.

(56) References Cited

U.S. PATENT DOCUMENTS

| | | | | |
|---|---|---|---|---|
| 2013/0223980 A1* | 8/2013 | Pastrick | ............... | B60K 11/085 415/1 |
| 2014/0273806 A1* | 9/2014 | Frayer, III | ........... | B60K 11/085 454/335 |

* cited by examiner

*Primary Examiner* — James A Shriver, II
*Assistant Examiner* — Hilary L Johns
(74) *Attorney, Agent, or Firm* — John S. Artz; Dickinson Wright PLLC

(57) ABSTRACT

A grill assembly for attachment to a vehicle front end including a base grill portion, having a front surface, a back surface, a perimeter portion, and cross-rail portions. The cross-rail portions define a plurality of grill openings therebetween. A plurality of louvers are configured to communicate with the plurality of grill openings. The assembly is in communication with a controller to effectuate generally linearly reciprocal movement of at least one of the base grill portion or the plurality of louvers in a direction generally defined by a direction of travel of the vehicle to vary an amount of air flow through the plurality of grill openings.

36 Claims, 6 Drawing Sheets

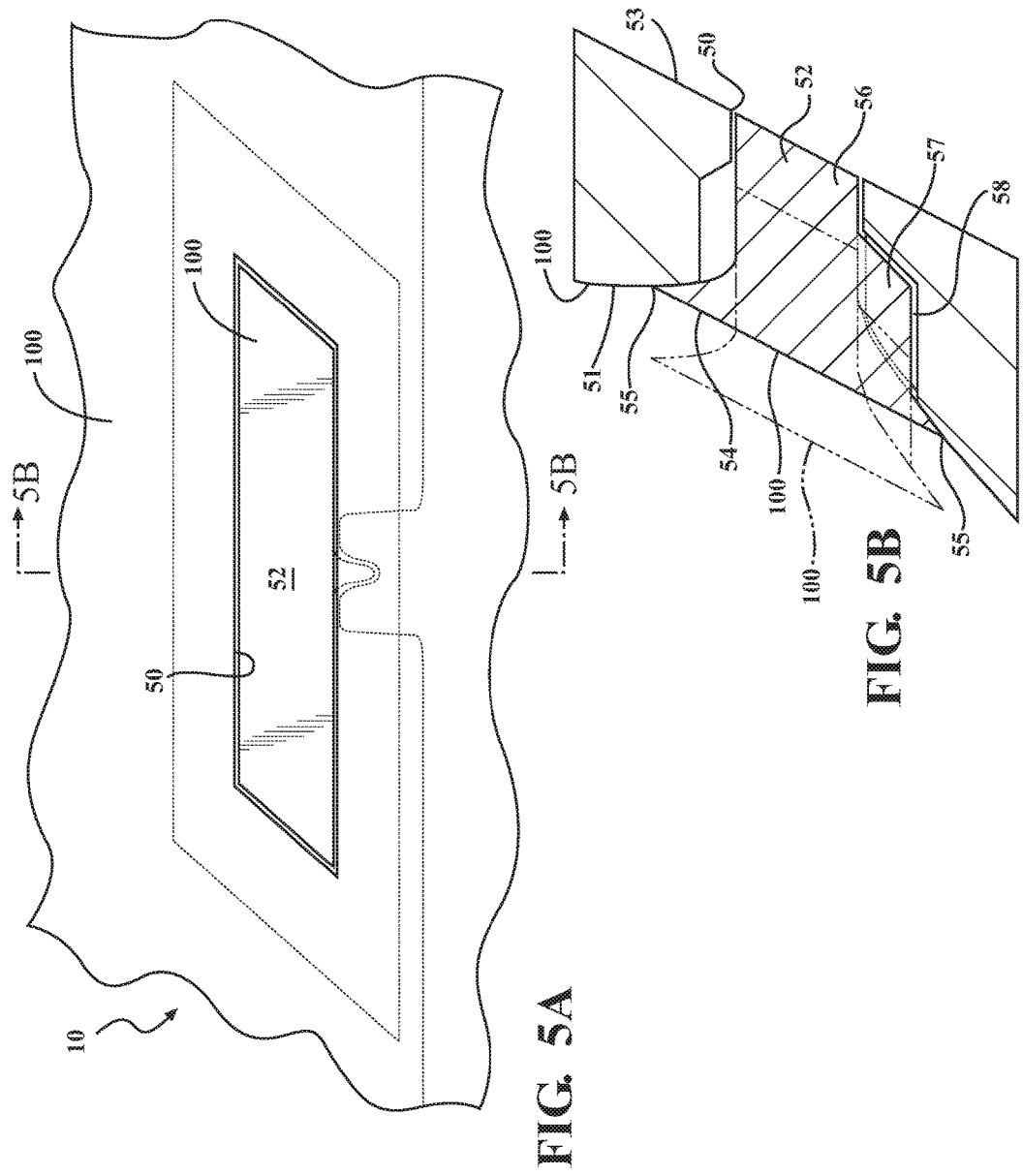

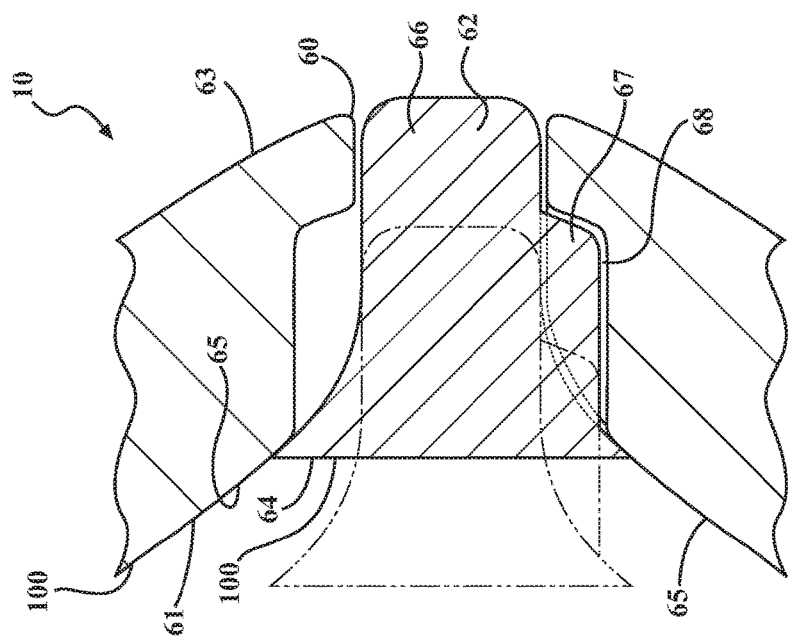
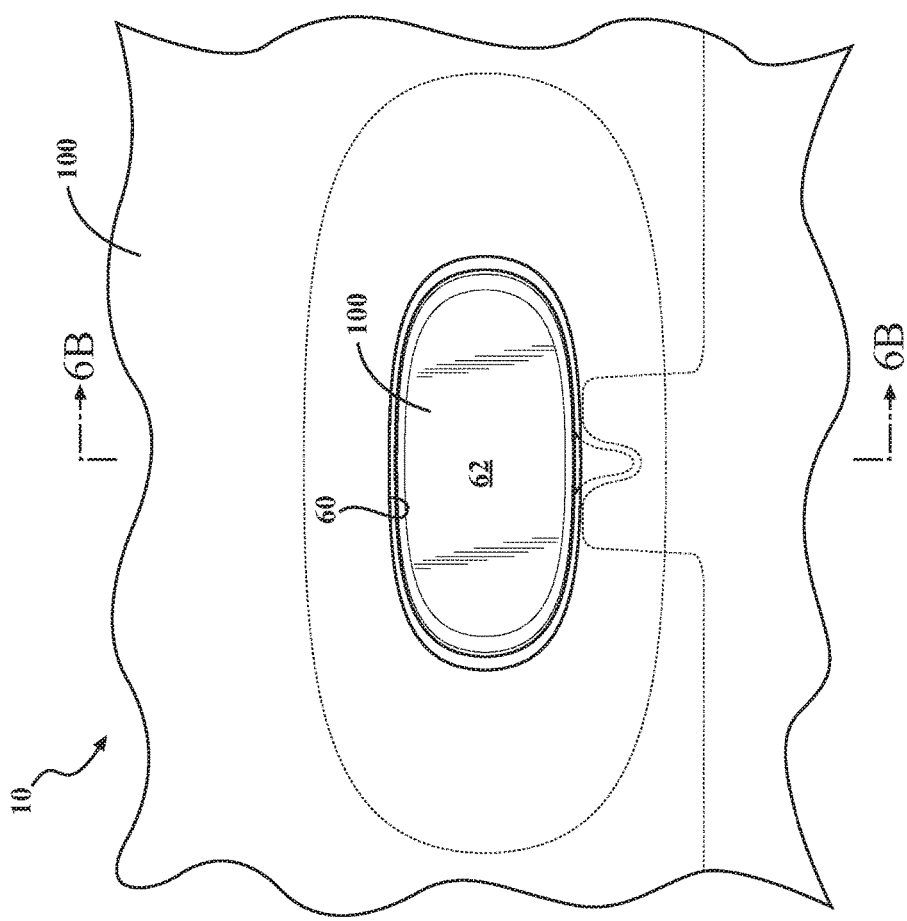
FIG. 6A
FIG. 6B

VEHICLE GRILL WITH RECIPROCAL MOVEABLE LOUVERS

CROSS-REFERENCE TO RELATED APPLICATIONS

The present application claims priority to U.S. Provisional Patent Application Ser. No. 62/059,302, entitled "Vehicle Grill With Linearly Reciprocal Moveable Louvers", filed on Oct. 3, 2014, which is hereby incorporated by reference herein.

TECHNICAL FIELD

The present invention relates generally to a grill for a vehicle. More particularly, the present invention relates to a grill for a vehicle that utilizes linearly reciprocal movement between a grill portion and associated louvers to close off grill openings and selectively vary the flow of air through the grill to the interior engine compartment.

BACKGROUND OF THE INVENTION

Vehicle grills are known to direct airflow into the engine compartment of a vehicle when it is driven. This airflow may be employed to cool components within the engine compartment, including the engine or transmission. However, engine components may not always require the full amount of airflow available to the vehicle. For example, under some conditions, such as when the ambient air and engine are cold, it may be advantageous to reduce airflow into the engine compartment to allow the engine to warm more quickly and provide warm air sooner through the heating and air conditioning system. Closing the openings of the grill, such as through the use of moveable louvers, may also be advantageous, provided that adequate cooling airflow is provided to the engine compartment, to reduce aerodynamic drag and improve fuel economy.

Grills with moveable grill louvers are known and the louvers are generally operated by an electric motor that drives a gear set to effectuate rotational movement of the louvers to block or restrict airflow through the grill openings. The louvers are typically configured to rotate between a fully open position where unrestricted airflow can occur through the grill openings and a closed position where airflow is blocked. Moreover, moveable louvers have generally been disposed behind the vehicle grill to close off the openings from their backside and thus are not prominently visible. As such, they do not contribute to the aesthetics of the vehicle. These systems also require the use of significant space in the engine compartment for proper rotation and operation, which is a disadvantage for packaging requirements.

As these systems all suffer from a variety of disadvantages, it is desirable to provide a vehicle grill that improves over these systems in both function and aesthetics.

SUMMARY OF THE INVENTION

Accordingly, it is an aspect of the present disclosure to provide a vehicle grill that utilizes linear movement between the grill and grill louvers to open and close grill openings and vary airflow through the grill.

It is another aspect of the present disclosure to provide a vehicle grill that can selectively close or partially close associated grill openings depending upon engine and/or vehicle operating conditions to reduce drag when less airflow is required to the engine.

It is still another aspect of the present disclosure to provide a vehicle grill that enhances function of a vehicle to which the grill is attached and also enhances the aesthetics of the vehicle.

It is yet another aspect of the present disclosure to provide a vehicle grill that employs linear movement between the grill and associated grill louvers to selectively close the grill openings to allow for faster engine warm up and reduce the carbon footprint of the vehicle.

It is a further aspect of the present disclosure to provide a vehicle grill that utilizes moveable louvers and minimizes the amount of space requirements in the engine compartment for operation of same.

It is still a further aspect of the present disclosure to provide a vehicle grill with moveable louvers that are disposed on an outer surface of the grill.

In accordance with the above and the other aspects of the present disclosure, a grill assembly for a vehicle front end is provided. The grill assembly includes a base grill portion, including a front surface, a back surface, a perimeter portion, and a plurality of cross rail portions. The plurality of cross rail portions define a plurality of grill openings which are configured to permit air flow therethrough from an exterior of the vehicle to an interior engine compartment. The plurality of grill openings are each in communication with at least one louver. The assembly is in communication with a controller to effectuate linearly reciprocal movement of at least one of the base grill portion or the plurality of louvers in a direction generally defined by a direction of travel of the vehicle to vary an amount of air flow through the plurality of grill openings.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 5A is a schematic front view of a portion of a vehicle grill with movable louvers in accordance with another aspect of the present disclosure;

FIG. 5B is a schematic side cross-sectional view of the vehicle grill portion of FIG. 5A;

FIG. 6A is a schematic front view of a portion of a vehicle grill with movable louvers in accordance with a further aspect of the present disclosure; and FIG. 6B is a schematic side cross-sectional view of the vehicle grill portion of FIG. 6A.

DETAILED DESCRIPTION OF THE PREFERRED EMBODIMENT

Figure 1:
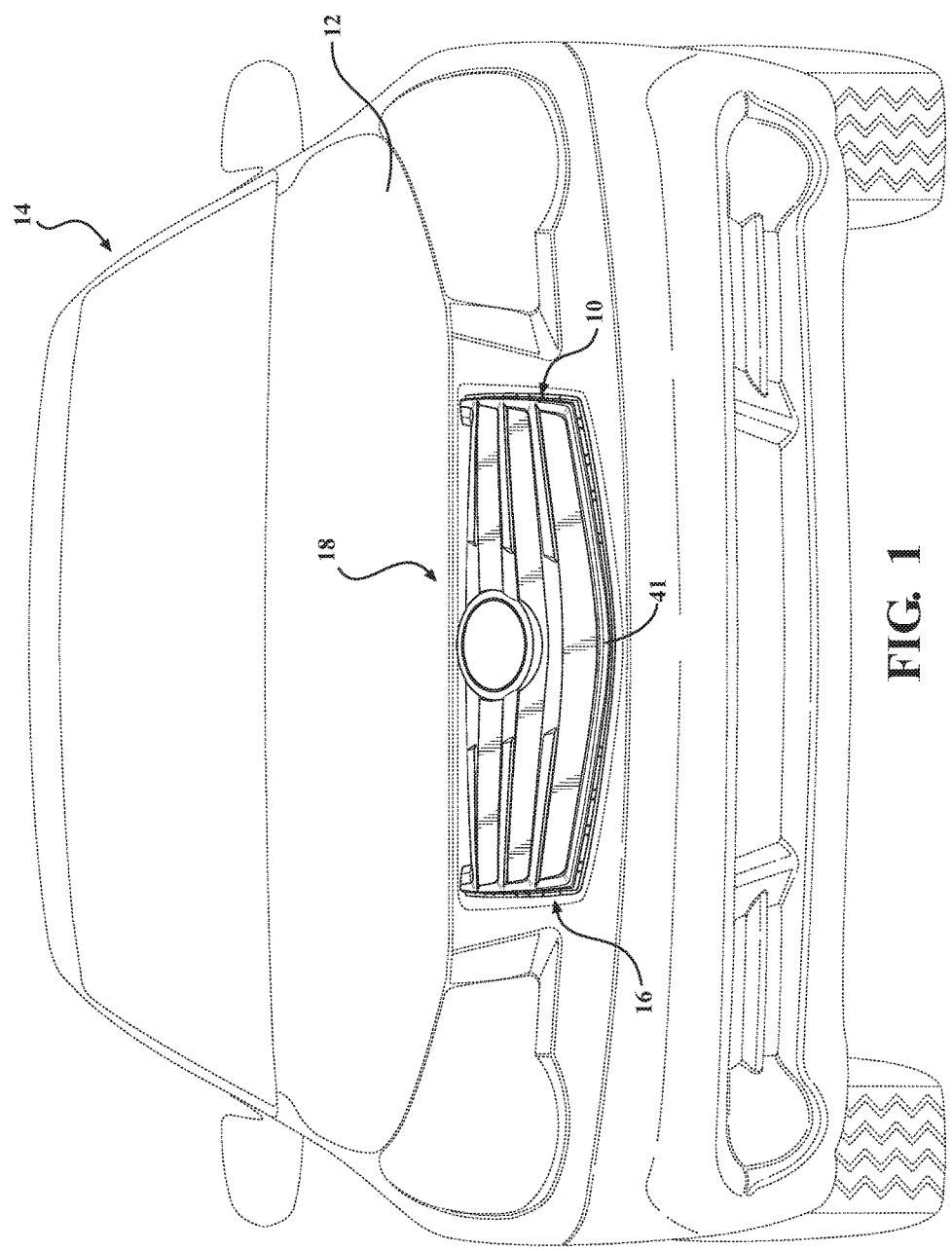
FIG. 1 is a perspective view of a vehicle grill attached to a vehicle in accordance with an aspect of the present disclosure.

The present disclosure relates generally to a grill for an automotive vehicle. According to an aspect, as shown schematically in FIG. 1, the grill 10 may be attached to a front portion of a vehicle 14. The vehicle 14 may include a central passageway 16 formed in the vehicle front portion 12 that extends between the exterior of the vehicle 14 and an engine compartment 18. It will be appreciated that the grill may be attached to any suitable vehicle where air can flow into the engine compartment, including for cooling purposes, such as a car, a truck, or heavy equipment. The grill may alternatively be employed on other suitable structures other than vehicles.

According to an aspect, the grill 10 may be formed of a plastic material and may be formed by a suitable forming process, such as injection molding. Alternatively, the grill 10 may be formed of a metal, a composite material or any other suitable material. According to a further aspect, the grill 10 may have a decorative surface 100 applied thereto, which is intended to enhance vehicle aesthetics. According to an aspect, the decorative surface may be a metal coating, such as Chrome or Nickel that is applied to the plastic grill surface by a metal plating process, such as a conventional electroplating process. However, other types of metal may be employed as a coating and other metalizing processes may be utilized. According to another aspect, the decorative surface may be paint or a variety of other suitable decorative aesthetic finishes or coatings that can be applied to the grill surface. According to a still further aspect, a decorative surface could consist of molded-in-color or insert-molded film, which are available from Lacks Enterprises, Inc. of Grand Rapids, Mich. It will be appreciated that the decorative surface may be applied to all of the grill or only a select portion or portions thereof. According to an aspect, the decorative surface may be applied to only the class A surfaces. According to still a further aspect, the decorative surface or a combination of surfaces may be applied to only a portion of the class A surface. It will also be appreciated that multiple decorative surfaces may be applied to the grill, such as a metal plated layer as well as paint layer over top thereof. Other combinations, configurations, and types of decorative surfaces may also be utilized.

Figure 2:
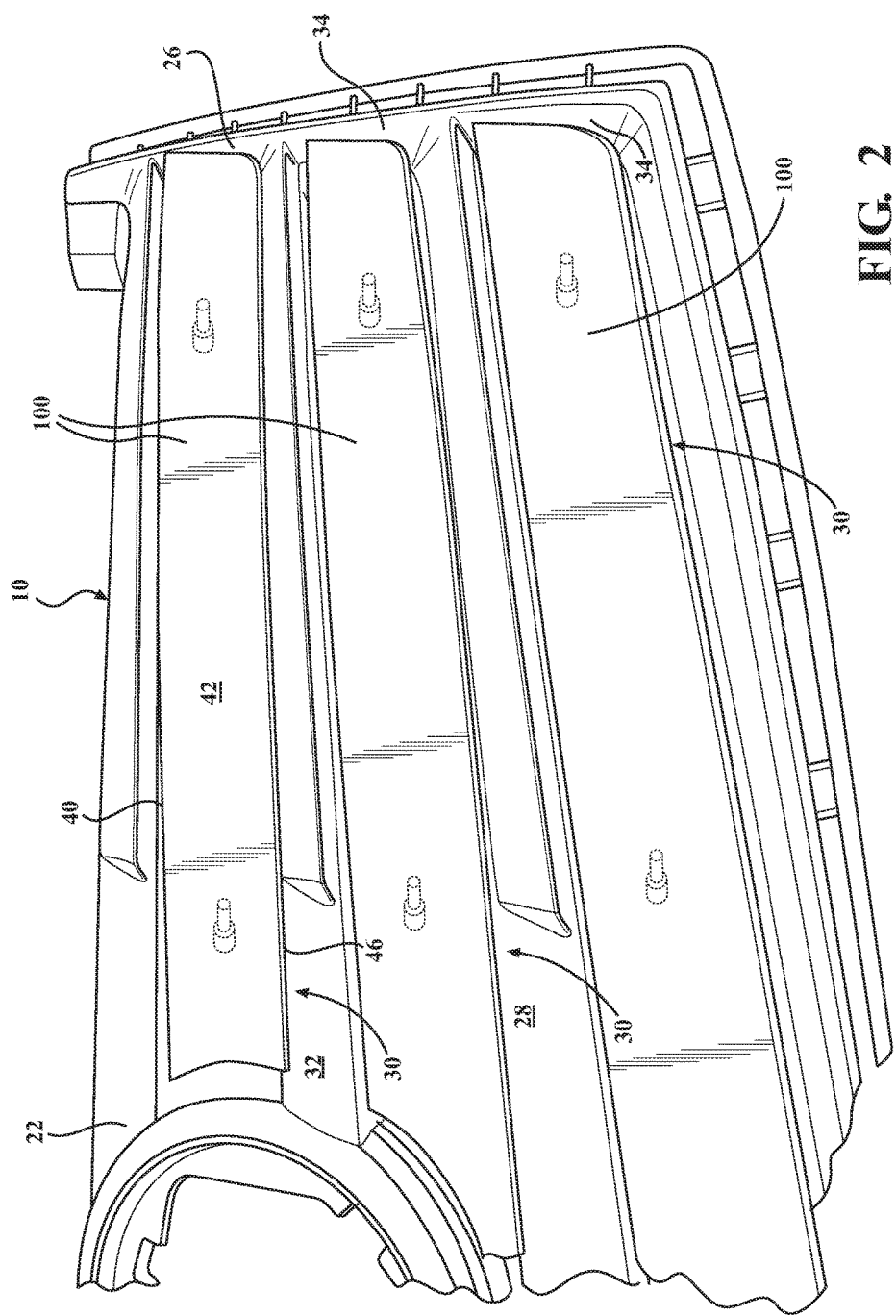
FIG. 2 is a schematic illustration of a vehicle grill with a plurality of movable louvers in a fully open position in accordance with an aspect of the present disclosure.
Figure 3:
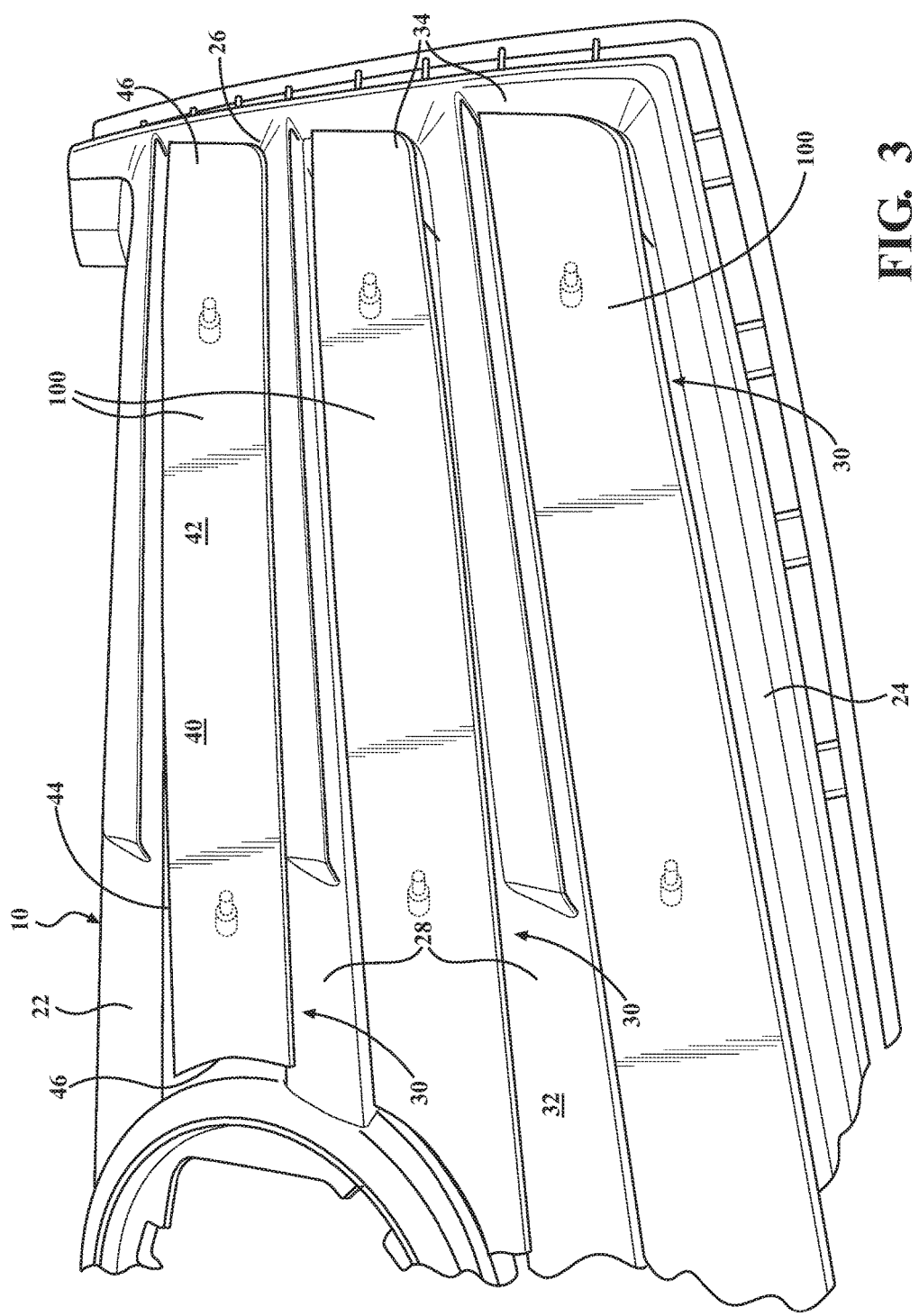
FIG. 3 is a schematic illustration of a vehicle grill with a plurality of moveable louvers in a partially open position in accordance with an aspect of the present disclosure.
Figure 4:
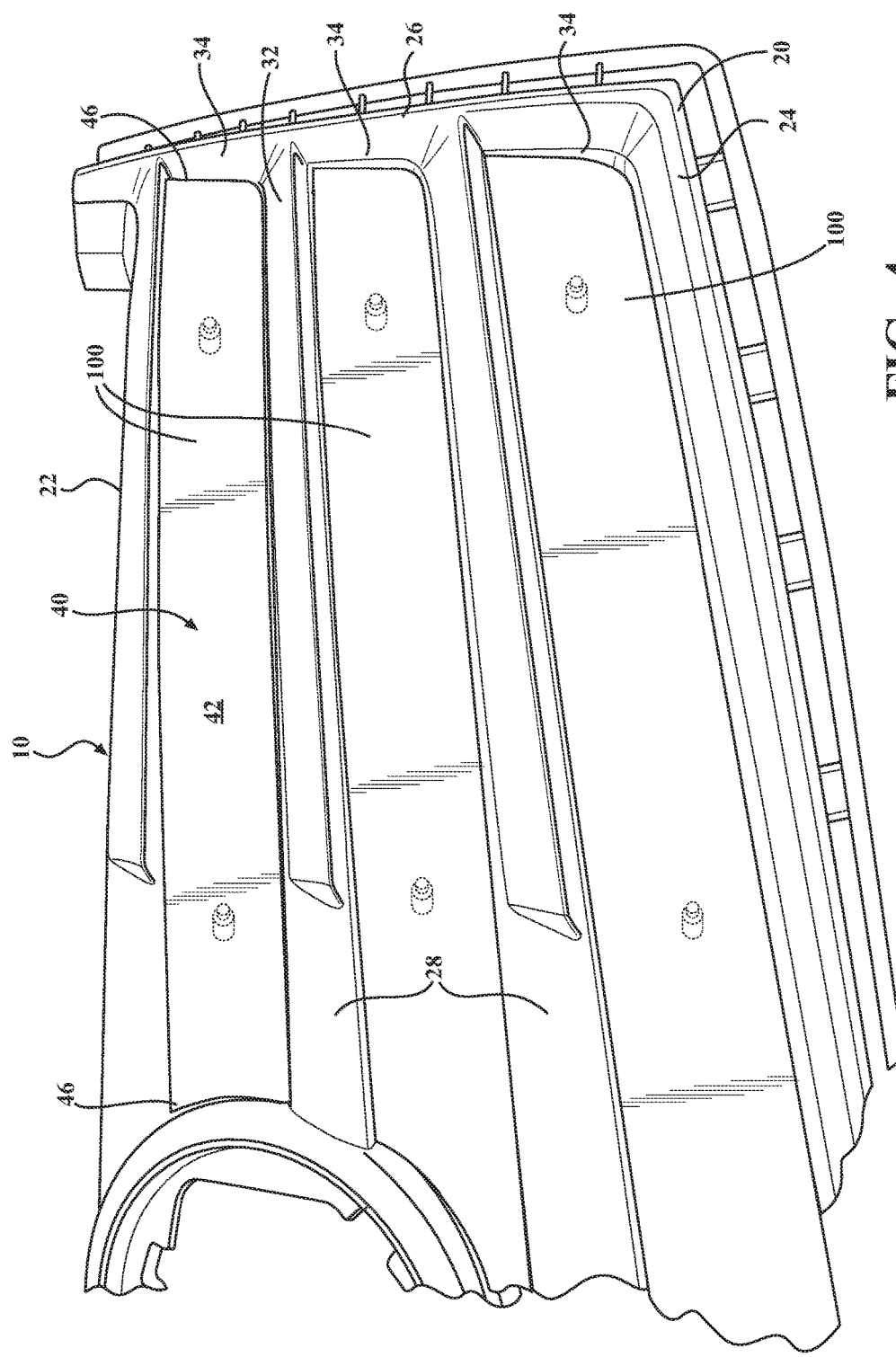
FIG. 4 is another schematic illustration of a vehicle grill with a plurality of movable louvers in a closed position in accordance with an aspect of the present disclosure.

According to an aspect and as shown in FIGS. 2 through 4, the vehicle grill 10 can include a base structure 20, having a top rail 22, a bottom rail 24, a pair of opposing side rails 26, and a middle rail 28. The top rail 22, the bottom rail 24, the side rails 26, and the middle rail 28 all serve as cross-rails. According to an aspect, the grill 10 may also include a plurality of grill openings 30 that are formed between the rails in a front face 32 of the grill 10. The grill openings 30 may be configured to permit air to flow through the grill 10 generally in a direction from the vehicle exterior into the engine compartment 18. The grill openings 30 may also be defined by a plurality of side surfaces 34 that extend inwardly away from the grill front face 32 toward the engine compartment. According to an aspect, one or more of the plurality of side surfaces 34 may be sloped or angled inwardly. It will be appreciated that the grill front face 32, the openings 30 and the side surfaces 34 may have a variety of different configurations. The grill may include any number of rails or none at all and may thus include a variety of different number of openings.

According to a further aspect, the grill 10 may include a system for selectively opening or closing the grill openings 30. In the open position, full airflow may be permitted to flow through the openings. While in the closed position, airflow may be prevented from flowing through the openings 30 into the engine compartment.

According to an aspect, the system can include a plurality of louvers 40 that are in communication with each of the grill openings 30. The louvers 40 may be configured to move with respect to each of the grill openings 30 to selectively block air from flowing therethrough or to allow air to flow therethrough unobstructed according to parameters defined by the system. The louvers 40 may also be moved to a variety of other intermediate positions to restrict airflow by partially blocking off the grill openings 30. The degree of obstruction and position of the louvers 40 may be controlled by a suitable control system and algorithms for opening and closing the grill openings 30 based on a variety of predetermined conditions or factors.

According to another aspect, the system may be employed to control airflow into a variety of other vehicle locations and may be employed in connection with a variety of other suitable structures. For example, the system may be employed to control airflow into the vehicle passenger compartment, for combustion or for other uses. According to another aspect, the disclosed system may be employed to selectively open or close other airflow passages, holes or ducts.

According to an aspect, each louver 40 may be configured to generally match the size and shape of a corresponding grill opening 30 with which it is designed to communicate. As shown, the grill openings 30 may be generally rectangular in shape. According to an aspect, the louvers 40 may have a corresponding rectangular shape. It will be appreciated that the size and shape of the grill openings 30 and the corresponding louvers 40 may vary. According to an aspect, each louver 40 can include a front surface 42, a back surface 44, and a plurality of side surfaces 46 that extend between and connect the front surface 42 and the back surface 44. According to a further aspect, the louver side surfaces 46 may generally match the shape, contour and slope of the inside side surfaces 34. According to an aspect, the louver side surfaces 46 may be angled in order to generally match the configuration of the grill opening side surfaces 34. According to an aspect, the shape of the louvers 42 may be designed to predominantly restrict airflow through the grill openings 30 when in the closed position.

According to an aspect, the louvers 40 may be moveable with respect to the grill openings 30. According to an aspect, the louvers 40 may be moveable in a linear direction, i.e., fore and back with respect to the direction of travel of the vehicle. This is contrasted with the rotational movement of louvers in prior systems. According to an aspect, the louvers 40 may be linearly moveable between an open position (see e.g. FIGS. 2 and 3) and a closed position (see e.g. FIG. 4) to expose or close off the grill openings 30.

In the open position, generally shown in FIGS. 2 and 3, the louvers 40 may be displaced or spaced outwardly (forwardly with respect to the direction of vehicle travel) from the openings 30 such that air may flow around the louvers 40 and into the openings 30. In the closed position, the louvers 40 may be nested in each of the grill openings 30 such that airflow through the openings is predominantly blocked. It will be appreciated that a variety of suitable structures may be employed to translate the louvers 40 between the open and the closed position. According to an aspect, linkage structures or moveable rods may be in communication with the louvers 40 to move them under direction of the control system in connection with a driving mechanism, such as a motor. It will be appreciated that any suitable structure may be employed for translating the louvers 40. In the nested position, the side surfaces 46 of the louvers 40 may engage the side surfaces 34 of the grill 10.

It will also be appreciated that the louvers 40 may move linearly in a direction normal or perpendicular to the face of the grill.

According to an aspect, the louvers 40 may be constructed as horizontal slats that have elongated rectangular sides. The louvers 40 may have a variety of different configurations, sizes and shapes. The louvers 40 may be formed of a plastic material, however, it will be understood that they can be formed of a metal or a variety of other suitable materials. According to an aspect, the louvers 40 may also be formed of a plastic material and may have a decorative surface or coating 100, such as a metal layer, thereon in the same fashion as discussed above in connection with the grill. Again, the decorative surface may be applied to just the front surface 42, i.e., the class A surface. The decorative surface may consist of a combination of different types of aesthetic treatments.

According to an aspect, in operation, the louvers 40 may be in a closed position at startup of the vehicle 14. As the vehicle 14 begins to travel, the louvers 40 may move to an open position for heat management purposes. Thereafter, as the vehicle increases to a certain predetermined speed, the louvers 40 can move to a closed position to reduce the coefficient of drag and provide improved aerodynamics for the vehicle. It will be understood that the louvers 40 can be controlled linearly to move at various predetermined different speeds and to different degrees of displacements depending upon the vehicle. For example, they can be partially closed under certain circumstances to allow limited airflow. Alternatively, the louvers 40 can be controlled to move under other conditions besides or in addition to vehicle speed. The exact conditions under which the louvers 40 move between the open and closed position is not critical and is not intended to be limiting. Moreover, under some conditions, the louvers 40 can also be partially open or partially closed to restrict air flow, but not totally blocking air flow through the openings 30. The movement and timing of the louvers 40 may be effectuated by a controller (not shown) that is in communication with the motor unit. It will also be appreciated that the louvers 40 may remain stationary and the grill 10 may translate forwardly and rearwardly in a generally linear path to effectuate opening and closing of the grill openings 30. According to an aspect, due to the angled configuration of the side surfaces 34 and the rails, in the closed position, the louvers 40 are recessed or flush with respect to the front face of the grill.

FIGS. 5A and 5B schematically illustrate another configuration of an exemplary grill opening 50 and corresponding louver 52 for a vehicle grill 10 in accordance with an aspect of the disclosure. It will be appreciated that the grill 10 can include multiple grill openings 50 and multiple corresponding louvers 52 and that they can also have different or varying shapes. According to an aspect as shown, the grill opening 50 may be configured generally as a parallelogram. According to another aspect, the louver 52 may also be generally shaped as a parallelogram such that in the closed position, the louver 52 may nest in the grill opening 50 to block off air flow through the grill. According to another aspect, the grill opening 50 may be smaller than the grill opening 30.

According to an aspect, the louver 52 may be configured to reciprocate between and open position where the louver 52 is removed from engagement with the opening 50 to allow airflow to flow through the opening and a closed position where airflow is blocked from passing through the opening. According to another aspect, the louver 52 may be disposed rearwardly of the opening 50 and may be configured to communicate with a backside of the opening 50 in the closed position. In the open position, the louver 52 may be disposed rearwardly from or behind the opening 50 such that airflow may pass through the opening 50. Again, the louver 52 may be in communication with a controller and a control system to control movement of the louver 52 between the open position and the closed position, including one or more intermediate positions therebetween.

According to an aspect, the louvers 40 may be constructed as horizontal slats that have elongated rectangular sides. The louvers 40 may have a variety of different configurations, sizes and shapes. For example, the louvers 40 may have surfaces that are curved as illustrated by the lower surface 41 of the lower two louvers 40 in FIG. 1. As also shown and discussed herein, the side surfaces of the louvers 41 may also be curved or non-planar. The louvers 40 may be formed of a plastic material, however, it will be understood that they can be formed of a metal or a variety of other suitable materials. According to an aspect, the louvers 40 may also be formed of a plastic material and may have a decorative surface or coating, such as a metal layer, thereon in the same fashion as discussed above in connection with the grill. Again, the decorative surface may be applied to just the front surface 42, i.e., the class A surface. The decorative surface may consist of a combination of different types of aesthetic treatments.

FIGS. 6A and 6B schematically illustrate another configuration of an exemplary grill opening 60 and corresponding louver 62 for a vehicle grill 10 in accordance with an aspect of the disclosure. It will be appreciated that the grill 10 can include multiple grill openings 60 and multiple corresponding louvers 62 and that they can also have different or varying shapes. According to an aspect as shown, the grill opening 60 may be configured generally as an oval or circle. According to another aspect, the louver 62 may also be generally shaped as an oval or circle such that in the closed position, the louver 62 may nest in the grill opening 60 to block off air flow through the grill. According to another aspect, the grill opening 60 may be smaller than the grill opening 30.

According to an aspect, the louver 62 may be configured to reciprocate between an open position where the louver 62 is removed from engagement with the opening 60 to allow airflow to flow through the opening and a closed position where airflow is blocked from passing through the opening. According to another aspect, the louver 62 may be disposed rearwardly of the opening 60 and may be configured to communicate with a backside of the opening 60 in the closed position. In the open position, the louver 62 may be disposed rearwardly from or behind the opening 60 such that airflow may pass through the opening 60. Again, the louver 62 may be in communication with a controller and a control system to control movement of the louver 62 between the open position and the closed position, including one or more intermediate positions therebetween.

According to a further aspect as shown in the Figures, the louver 62 may be disposed forwardly of the grill front face in the open position and can include a front head portion 64 and a stem portion 66. The stem portion 66 may extend into the opening 60. In the closed position, the stem portion 66 may reside substantially in the opening 60 and extend from the front surface 61 to the rear surface 63 of the grill 10. Also, in the closed position, the front head portion 64 can engage the front surface of the grill portion 10. As also shown, an area 65 of the front surface of the grill portion 10 may be recessed or sloped inwardly adjacent the opening 60 such that the front head portion 64 can be flush with or recessed with respect to the front surface 61. Additionally, the louver 62 can include an enlarged lower portion 67 that can engage with a corresponding surface 68 in the opening 60 to provide support for the lover 62 in the closed position.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claim is:

1. A grill assembly for attachment to a vehicle front end, comprising:
    a base grill portion having a front surface, a back surface, a perimeter portion, and a plurality of cross-rail portions;
    a plurality of grill openings disposed in the base grill portion and generally between the plurality of cross-rail portions, the plurality of grill openings configured to permit air flow from an exterior of the vehicle to an interior compartment;
    a plurality of louvers, each having a front side, each of the plurality of louvers configured to communicate with a forward portion of a respective one of the plurality of grill openings, such that each of the plurality of louvers communicates with one or more of the plurality of grill openings;
    the plurality of louvers configured to move in their entirety between a first position where the plurality of louvers are disposed such that air can flow through each of the corresponding ones of the plurality of grill openings and a second position where each of the plurality of louvers engages a respective one of the plurality of grill openings to close off air flow through each of the plurality of grill openings;
    whereby, in both the first and second positions, the front sides of each of the plurality of louvers are oriented generally parallel to the base grill portion.

2. The grill assembly of claim 1, wherein in the first position, the plurality of louvers are disposed outwardly with respect to the front surface of the base grill portion; and
    wherein in the second position, the plurality of louvers engage the front surface of the base grill portion.

3. The grill assembly of claim 2, wherein the decorative metal layer is selected from at least one of the following: nickel, chromium, and copper.

4. The grill assembly of claim 2, wherein in the second position, the plurality of louvers are nested in the plurality of openings.

5. The grill assembly of claim 1, wherein the grill openings have a generally rectangular shape and each of the plurality of louvers has a corresponding rectangular shape such that the louvers close off the grill openings when in the second position.

6. The grill assembly of claim 1, wherein each of the plurality of louvers is configured to be disposed in a third position which partially closes off each of the plurality of grill openings.

7. The grill assembly of claim 1, wherein each of the grill openings and each of the plurality of louvers have corresponding shapes such that when the louvers engage the grill openings in the second position they serve to serve to seal off the grill openings and close off air flow through.

8. The grill assembly of claim 1, further comprising:
    a moveable linkage structure in communication with each of the plurality of louvers to effect translational movement of each of the louvers from the first position to the second position.

9. The grill assembly of claim 1, wherein in the second position, the back side of each of the plurality of louvers is recessed with respect to the front surface of the base grill portion.

10. The grill assembly of claim 1, wherein the plurality of cross-rail portions are sloped in a direction of the back surface of the base grill portion adjacent each of the plurality of grill openings.

11. The grill assembly of claim 1, wherein the front side of each of the plurality of louvers has a decorative surface thereon, where in the decorative surface is selected from one or more of the following: metal finish, molded-in-color, paint, and film.

12. The grill assembly of claim 1, wherein at least one of the plurality of louvers has a non-rectangular shape.

13. The grill assembly of claims 12, wherein the at least one of the plurality of louvers has a surface that is curved.

14. A grill assembly for attachment to a vehicle front end comprising:
    a base grill portion having a front surface, a back surface, perimeter portion and a plurality of cross-rail portions;
    a plurality of grill openings disposed generally between the plurality of cross-rail portions, the plurality of grill openings configured to permit air flow from an exterior of the vehicle to an interior compartment;

a plurality of louvers each having a front side and being configured to communicate with the front surface of the base grill portion, the plurality of louvers being disposed on the grill assembly such that they can move between a first position and a second position, such that the entirety of each of the plurality of louvers moves between the first position and the second position;

each of the plurality of louvers in communication with at least a respective one of the plurality of grill openings;

whereby in the first position the plurality of grill openings are exposed to allow air to flow therethrough and a second position where the plurality of louvers nest within each of the plurality of grill openings to substantially prevent air flow therethrough.

15. The grill assembly of claim 14, wherein in the first position, the plurality of louvers are disposed outwardly with respect to the front surface of the base grill portion; and wherein in the second position, the plurality of louvers engage the front surface of the base grill portion.

16. The grill assembly of claim 14, wherein the front side of each of the plurality of louvers and the front surface of the base grill portion have a decorative layer disposed thereon, wherein the decorative layer is selected from one or more of the following: metal finish, molded-in-color, paint, and film.

17. The grill assembly of claim 16, wherein the decorative metal finish is selected from at least one of the following: nickel, chromium, and copper.

18. The grill assembly of claim 14, wherein plurality of the grill openings have a generally rectangular shape and each of the plurality of louvers has a corresponding rectangular shape such that the louvers close off the grill openings when in the second position.

19. The grill assembly of claim 14, wherein each of the plurality of louvers is configured to be disposed in a third position which partially closes off each of the plurality of grill openings.

20. The grill assembly of claim 14, wherein each of the grill openings has a generally oval shape and each of the plurality of louvers has a corresponding oval shape such that the louvers close off air flow through the grill openings when in the second position.

21. The grill assembly of claim 14, further comprising:
a moveable linkage structure in communication with each of the plurality of louvers to effect translational movement of each of the louvers from the first position to the second position.

22. The grill assembly of claim 14, wherein in the second position, the back side of each of the plurality of louvers is recessed with respect to the front surface of the base grill portion.

23. The grill assembly of claim 14, wherein at least one of the plurality of louvers has a non-rectangular shape.

24. The grill assembly of claim 23, wherein the at least one of the plurality of louvers has a surface that is curved.

25. A grill assembly for attachment to a vehicle front end, comprising:
a base grill portion having a front surface, a back surface, and a perimeter portion;
a plurality of grill openings formed in the front surface configured to permit air flow from an exterior of the vehicle to and interior engine compartment;
a plurality of louvers configured to move generally between a first position where the grill openings are exposed to allow air flow therethrough and a second position where each of the plurality of louvers closes off at least a respective one of the plurality of grill openings such that air is prevented from flowing therethrough;
wherein in the first position, the plurality of louvers are disposed outwardly with respect to the front surface of the base grill portion;
whereby in the second position, the plurality of louvers engage the front surface of the base grill portion;
whereby in both the first position and the second position the front surface of the plurality of louvers lies generally parallel to the base grill portion.

26. The grill assembly of claim 25, wherein the front surface of the base grill portion has a decorative metal layer disposed thereon.

27. The grill assembly of claim 26, wherein the plurality of louvers have a front surface and wherein the front surface of the plurality of louvers has a decorative metal layer disposed thereon.

28. The grill assembly of claim 27, wherein the decorative metal layer on the front surface of the base grill portion and the front surface of the plurality of louvers is selected from at least one of the following:
nickel, chromium, and copper.

29. The grill assembly of claim 26, wherein in the second position, the plurality of louvers are nested in the plurality of openings.

30. The grill assembly of claim 25, wherein the grill openings have a generally rectangular shape and each of the plurality of louvers has a corresponding rectangular shape such that the louvers close off the grill openings when in the second position.

31. The grill assembly of claim 25, wherein each of the plurality of louvers is configured to be disposed in a third position which partially closes off each of the plurality of grill openings.

32. The grill assembly of claim 25, wherein each of the grill openings has a generally oval shape and each of the plurality of louvers has a corresponding oval shape such that they close off air flow through the grill openings when in the second position.

33. The grill assembly of claim 25, further comprising:
a moveable linkage structure in communication with each of the plurality of louvers to effect translational movement of each of the louvers from the first position to the second position.

34. The grill assembly of claim 25, wherein in the second position, the back side of each of the plurality of louvers is recessed with respect to the front surface of the base grill portion.

35. The grill assembly of claim 25, wherein at least one of the plurality of louvers has a non-rectangular shape.

36. The grill assembly of claim 35, wherein the at least one of the plurality of louvers has a surface that is curved.

* * * * *